United States Patent
Vidal et al.

(10) Patent No.: US 8,316,224 B2
(45) Date of Patent: *Nov. 20, 2012

(54) SYSTEMS AND METHODS FOR TRACKING A HISTORY OF CHANGES ASSOCIATED WITH SOFTWARE PACKAGES AND CONFIGURATION MANAGEMENT IN A COMPUTING SYSTEM

(75) Inventors: Seth Kelby Vidal, Raleigh, NC (US); Adrian Karstan Likins, Raleigh, NC (US); Michael Paul DeHaan, Morrisville, NC (US); James Antill, Bristol, CT (US)

(73) Assignee: Red Hat, Inc., Raleigh, CA (US)

( * ) Notice: Subject to any disclaimer, the term of this patent is extended or adjusted under 35 U.S.C. 154(b) by 474 days.

This patent is subject to a terminal disclaimer.

(21) Appl. No.: 12/551,523

(22) Filed: Aug. 31, 2009

(65) Prior Publication Data

US 2011/0055544 A1    Mar. 3, 2011

(51) Int. Cl.
  *G06F 9/00* (2006.01)
  *G06F 9/24* (2006.01)
  *G06F 15/177* (2006.01)
  *G06F 9/44* (2006.01)
  *G06F 9/445* (2006.01)

(52) U.S. Cl. ............ 713/100; 713/1; 713/2; 717/168; 717/174

(58) Field of Classification Search .......... None
See application file for complete search history.

(56) References Cited

U.S. PATENT DOCUMENTS

| | | | | |
|---|---|---|---|---|
| 5,619,716 | A  * | 4/1997 | Nonaka et al. | 717/167 |
| 6,704,933 | B1 * | 3/2004 | Tanaka et al. | 725/132 |
| 7,614,046 | B2 * | 11/2009 | Daniels et al. | 717/170 |
| 2002/0083343 | A1 | 6/2002 | Crosbie et al. | |
| 2003/0159070 | A1 | 8/2003 | Mayer et al. | |
| 2004/0117783 | A1* | 6/2004 | Kaminsky et al. | 717/169 |
| 2008/0155526 | A1* | 6/2008 | Gokhale | 717/169 |
| 2009/0064100 | A1* | 3/2009 | Schiefer | 717/110 |
| 2010/0058294 | A1* | 3/2010 | Best et al. | 717/122 |
| 2011/0055826 | A1* | 3/2011 | Vidal et al. | 717/177 |
| 2011/0107300 | A1 | 5/2011 | Vidal | |
| 2011/0107419 | A1 | 5/2011 | Vidal | |
| 2011/0131564 | A1 | 6/2011 | Vidal | |
| 2011/0131565 | A1 | 6/2011 | Vidal | |
| 2011/0214111 | A1 | 9/2011 | Vidal | |
| 2011/0214114 | A1 | 9/2011 | Vidal | |
| 2011/0265073 | A1 | 10/2011 | Vidal | |
| 2011/0296390 | A1 | 12/2011 | Vidal | |

* cited by examiner

*Primary Examiner* — Ji H Bae
(74) *Attorney, Agent, or Firm* — Lowenstein Sandler PC (57) ABSTRACT

In order to track actions performed by a package manager or a configuration management system, a computing system can be configured to include a tagging tool. The tagging tool can be configured to cooperate with the package manager and the configuration management system in order to determine and generate a history of the actions performed by the package manager and the configuration management system. The history can include a description of the actions, the reasons why the actions were performed, and a list and description of the software programs, files, and software libraries that are affected by the actions.

20 Claims, 9 Drawing Sheets

| EVENT ID | SOFTWARE PACKAGE | REASONS FOR ACTION | ITEMS AFFECTED | DATE | COMMENTS |
|---|---|---|---|---|---|
| 00002 | OPEN OFFICE V.2 | UPDATING V.1 TO V.2 | OPEN OFFICE WRITER OPEN OFFICE SPREADSHEET LIBRARY X LIBRARY Y | 1/1/2009 | |
| 00001 | OPEN OFFICE V.1 | INSTALLING NEW PACKAGE | OPEN OFFICE WRITER OPEN OFFICE SPREADSHEET LIBRARY X LIBRARY Y | 11/3/2008 | |
| . . . . | | | | | |
| | | | | | |

| LIBRARY X | | | | |
|---|---|---|---|---|
| EVENT ID | VERSION | ACTION | REASONS FOR ACTION | DATE |
| 00002 | V.1 | UPDATED | OPEN OFFICE UPGRADED V.1 TO V.2 | 1/1/2009 |
| 00001 | V.2 | ADDED | OPEN OFFICE V.1 INSTALLED | 11/3/2008 |
| ⋮ | | | | |
| | | | | |

350 → (row 00002)
355 → (row 00001)

FIG. 3B

| EVENT ID | SOFTWARE PACKAGE | REASONS FOR ACTION | ITEMS AFFECTED | DATE | COMMENTS |
|---|---|---|---|---|---|
| 10001 | UPDATE MANAGEMENT CLASS A | MANAGEMENT CLASS UPDATE TO UPDATE OS | OS SOFTWARE LIBRARY X | 2/1/2009 | |
| 10000 | NEW MANAGEMENT CLASS A | NEW MANAGEMENT CLASS APPLIED TO SYSTEM | OS | 10/15/2008 | |
| . . . . . | | | | | |

FIG. 4A

| LIBRARY X | | | | |
|---|---|---|---|---|
| EVENT ID | VERSION | ACTION | REASONS FOR ACTION | DATE |
| 10001 | V.3 | UPDATED | UPDATE OF MANAGEMENT CLASS A | 2/1/2009 |
| 00002 | V.2 | UPDATED | OPEN OFFICE UPGRADE V.1 TO V.2 | 1/1/2009 |
| 00001 | V.1 | ADDED | OPEN OFFICE V. INSTALLED | 11/3/2008 |
| ⋮ | | | | |

SYSTEMS AND METHODS FOR TRACKING A HISTORY OF CHANGES ASSOCIATED WITH SOFTWARE PACKAGES AND CONFIGURATION MANAGEMENT IN A COMPUTING SYSTEM

FIELD

This invention relates generally to computer software installation and configuration management for a computing system.

DESCRIPTION OF THE RELATED ART

Today, a person using a computing system has a variety of avenues for obtaining software and installing the software on the computing system, such as purchasing physical media and downloading the software over a network. When downloading the software over a network, the person can acquire and install the software using a software package management system. The software package management system typically consists of a software repository which stores and maintains various software packages. The software packages typically consist of software stored in an archive format that includes data for installing the software.

To obtain the software package, the person can utilize a package manager. The package manager is responsible for retrieving the software package and installing the software package on the computing system. Typically, the package manager maintains a record of how the software package was installed. For example, the package manager may maintain data used to install the software package. However, the package manager does not maintain an accurate and complete history of why the software package was installed and the effect the installation had on the computing system. For example, if a user installs a software package, which causes the package manager to install software X and update software library Y, the user has no mechanism, at a later time, to determine why software library Y, was updated. Moreover, if library Y is later altered, the user has no mechanism to identify that the alteration of software library Y may affect software X.

In addition to the package manager, other software programs can alter the computing system. For example, the computing system can be under the control of a configuration management system. The configuration management system can be responsible for changing the configuration and settings of the computing systems. Likewise, the configuration management system can alter files on the computing system and install software on the computing systems. As with the package manager, the configuration management system does not maintain an accurate and complete history of why it has made changes to the computing systems. Additionally, the package manager and configuration management systems may not be aware of the changes that each makes.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for tracking a history of changes associated with software packages and configuration management on a computing system. More particularly, a tagging tool can track the changes made to software packages, reasons for the changes to the software packages, changes made during configuration management, and reasons for the changes.

According to embodiments, in order to track actions performed by a package manager and a configuration management system, a computing system can be configured to include a tagging tool. The tagging tool can be configured to cooperate with the package manager and the configuration management tool in order to determine and generate a history of the actions performed by the package manager and the configuration management system. The history can include a description of the actions, the reasons why the actions were performed, and a list and description of the software programs, files, and software libraries that are affected by the actions.

According to embodiments, the tagging tool can be configured to maintain records reflecting the history of the actions performed by the package manager and the configuration management system. The tagging tool can be configured to store the information about the actions in a package event record, configuration event record, and a set of change records. The tagging tool can be configured to utilize the package event record to store the complete history of each action performed by the package manager. The tagging tool can be configured to utilize the configuration event record to store the complete history of each action performed by the configuration management system. The tagging tool can be configured to utilize the set of change records to store a history of bow each action affects particular software programs, files, and software libraries.

By utilizing the tagging tool, the package manager, the configuration management system, and/or a user of the computing system can utilize the tagging tool to track a history all actions performed by the package manager and the configuration management system, and the reasons the actions were performed. Additionally, the user of the computing system, the configuration management system, and/or the package manager can utilize the history of the action in order to access what effect additional actions will have on the computing system. As such, the user of the computing system can efficiently and reliably modify the computing system with assurances that the modification will not damage existing software of the computing system.

Figure 1:
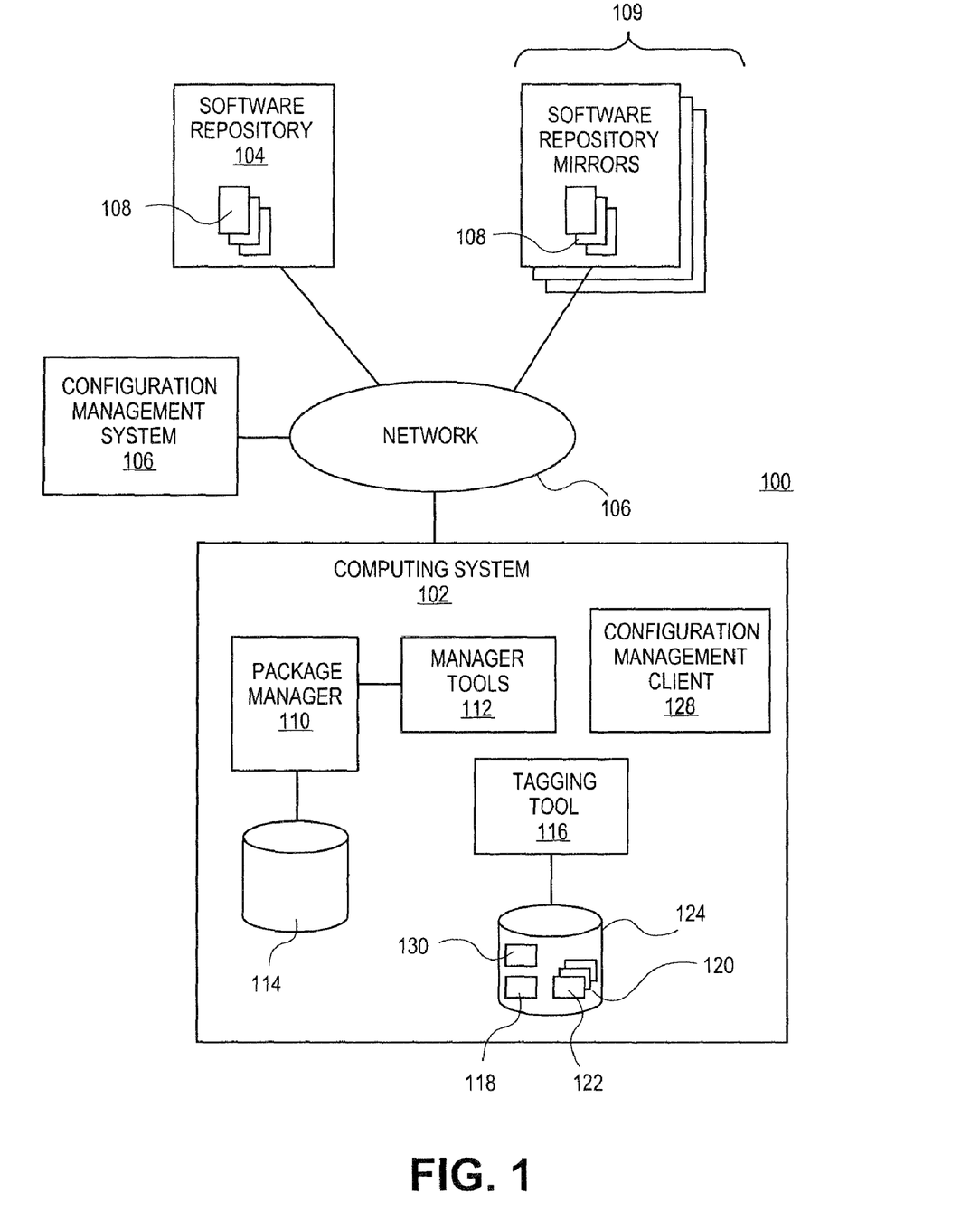
FIG. 1 illustrates an exemplary software package delivery and management system implementing a tagging tool, in which various embodiments of the present teachings can be practiced.

FIG. 1 illustrates a software package delivery and management system 100, according to various embodiments of the present teachings. While FIG. 1 illustrates various components that can be included in the software package delivery and management system 100, one skilled in the art will realize that additional components can be added or existing components can be removed.

In embodiments, as illustrated in FIG. 1, the software package delivery and management system 100 can be designed to allow a computing system 102 to communicate with a software repository 104, via one or more networks 106, in order to obtain one or more software packages 108. The software repository 104 can be implemented as any type of open-source or proprietary software repository, which can store the software packages 108 and provide the software packages to computing systems, such as the computing system 102, requesting the software packages via the one or more networks 106. For example, the software repository 104 can be implemented as a Yellowdog Updater, Modified (Yum) repository, Debian™ repository, or any other type of conventional software repository.

In embodiments, as described herein, the software packages 108, can include one or more software programs that are packaged together in a format that allows a package manger or package installer to install the software programs, contained in the software packages 108, on a computing system. The software programs included in the software packages 108 can be any type of software programs such as operating systems (OS), application programs, and the like. The software packages 108 can also include metadata that describes the software package, such as the name of the software package, the software programs included in the package, version of the software package, description of the purpose of the software package, etc. The software packages 108 can also include metadata that aids in the installation of the software programs contained in the software packages 108, such as checksums and a list of dependencies of the software package. The list of dependencies can describe the relationship of the software programs contained in the software packages 108 and any other software programs, file, software libraries, etc. required by the software packages 108.

In embodiments, the software repository 104 can store the software packages 108 in any type of open-source or proprietary format depending on the type of software repository 104. For example, the software packages 108 can be in conventional formats such as RPM format for a Yum repository, .deb format for a Debian™ repository, or other conventional formats.

In embodiments, the software package delivery and management system 100 can also include one or more software repository mirrors 109, coupled to the network 106. The software repository mirrors 109 can be configured to maintain copies of the software packages 108. The software repository mirrors 109 can be configured to backup the software repository 104. For example, the software repository mirrors 109 can provide the software packages 108 to computing systems, such as computing system 102, in the event that the software repository 104 is unavailable or the software repository 104 is experiencing high traffic.

In embodiments, the software repository 104 and the software repository mirrors 109 can be supported by any type of computing system capable of storing the software packages 108, capable of communicating with the one or more networks 106, and capable of running a repository application for cooperating with a package manager or package installer in order to deliver the software packages 108. For example, the software repository 104 and the software repository mirrors 109 can be supported by conventional computing systems or other devices such as such as servers, personal computers, laptop computers, network-enabled media devices, networked stations, etc. As such, the computing system supporting the software repository 104 and the software repository mirrors 109 can include conventional hardware such as processors, memory, computer readable storage media and devices (CD, DVD, hard drive, portable storage memory, etc.), network devices, and the like.

In embodiments, the one or more networks 106 can be or include the Internet, or other public or private networks. The one or more or more networks 110 can be or include wired, wireless, optical, and other network connections. One skilled in the art will realize that the one or more networks 110 can be any type of network, utilizing any type of communication protocol, to connect computing systems.

In embodiments, the computing system 102 can be any type of conventional computing system or other device such as such as servers, personal computers, laptop computers, network-enabled media devices, networked stations, etc. As such, the computing system 102 can include conventional hardware such as processors, memory, computer readable storage media and devices (CD, DVD, hard drive, portable storage memory, etc.), network devices, and the like.

In embodiments, the computing system 102 can be configured to include a package manager 110. The package manager 110 can be configured to cooperate with the software repository 104 to perform various actions associated with the software packages 108. For example, the package manager 110 can be configured retrieve one or more of the software packages 108 and configured to install the software packages on the computing system 102. Likewise, the package manager 110 can be configured to retrieve updates to software packages 108, already installed on the computing system 102, and install the updates on the computing system 102.

In embodiments, the package manager 110 can be configured to cooperate with manager tools 112 to perform actions related to the software packages 108. For example, the manager tools 112 can be configured to install and update particular application programs, files, or software libraries maintained by the software repository 104. As such, the manager tool 112 can be configured to provide a request to the package manager 110 to perform the installation or update.

In embodiments, the package manager 110 can be configured to allow a user of the computing system 102 to request the various actions associated with the software repository 104 to be performed. To achieve this, the package manager 110 can be configured to provide command line or graphical user interfaces (GUIs) that allow the user to direct the package manager 110 to perform the actions. For example, the package manager 110 can provide GUIs that display the software packages 108, such as new software packages and software package updates, available in the software repository 104 and that allow the user to select the action to be performed related to the software packages 108.

In embodiments, in order to perform the various actions, the package manager 110 can be configured communicate with the software repository 104 and retrieve data from the software repository 104. For example, when providing the GUIs to a user of the computing system 102, the package manager 110 can retrieve a list of the software packages 108 from the software repository 104. Likewise, for example, when installing or updating a particular software package 108, the package manager 110 can retrieve the particular software package 108 and any other data associated with the particular software package 108.

In embodiments, when performing the various actions, the package manager 110 can be configured to utilize the metadata associated with the software packages 108 in order to perform the actions. For example, when installing a particular software package 108 or updating a particular software package 108, the package manager 110 can access the metadata associated with the particular software packages 108 in order to properly install or update the software packages on the computing system 102. For instance, the package manager 110 can utilize the list of dependencies in the metadata in order to identify the software programs, files, and software libraries that are affected. Additionally, when performing the various actions, the package manager 110 can be configured to store the metadata in a database 114.

In embodiments, the package manager 110 can be any application program that is capable of executing on the computing system 102 to perform the actions related to the software repository 104. For example, the package manager 110 can be any type of conventional open-source or proprietary package manager such as Yum package manager, Debian™ package manager, and the like. The package manager 110 can be stored on computer readable storage devices or media (CD, DVD, hard drive, portable storage memory, etc.) of the computing system 102 and executed by the computing system 102.

In embodiments, in order to track actions performed by the package manager 110, the computing system 102 can be configured to include a tagging tool 116. The tagging tool 116 can be configured to cooperate with the package manager 110 in order to determine and generate a history of the actions performed by the package manager 110. The history can include a description of the actions, the reasons why the actions were performed, and a list and description of the software programs, files, and software libraries that are affected by the actions. As such, the package manager 110 or a user of the computing system 102 can utilize the tagging tool 116 to track a history of all actions performed by the package manager 110 and the reasons the actions were performed. Additionally, the user of the computing system 102 and/or the package manager 110 can utilize the history of the action in order to access what effect additional actions will have on the computing system 102.

In embodiments, the tagging tool 116 can be configured to include an application programming interface (API) that the package manager 110 can call in order to invoke the tagging tool 116. For example, when the package manager 110 performs a particular action (software package 108 installation, software package 108 update, etc.), the package manager 110 can call the tagging tool 116. Once invoked, the tagging tool 116 can determine and generate the history of the particular action performed by the package manager tool 110 when called.

In embodiments, in order to determine the history, the tagging tool 116 can be configured to acquire the metadata and any other information associated with the action performed by the package manager 110. For example, when the package manager 110 invokes the tagging tool 116, the package manager 110 can be configured to provide, via the API, the metadata for the software package 108 associated with the action. Likewise, when the package manager 110 invokes the tagging tool 116, the package manager 110 can be configured to provide, via the API, other information such as a description of the action (e.g. action selected by the user via a GUI, description of the action, and the like). Additionally, the tagging tool 116 can be configured to retrieve, via the API, the metadata and any other information, associated with the action, from the database 114.

In embodiments, the tagging tool 116 can be configured to acquire, from a user of the computing system 102, additional information about the actions being performed by the package manager 110. To achieve this, the tagging tool 116 can be configured to generate GUIs that allow a user to enter information about the actions, such as comments on the actions, a description of the actions, etc. The tagging tool 116 can be configured to provide the GUIs and receive information entered into the GUIs via the API. For example, when the package manager 110 invokes the tagging tool 116, the tagging tool 116 can be configured to generate the GUIs and provide the GUIs, via the API.

In embodiments, once the metadata and any other information is acquired, the tagging tool 116 can be configured to identify specific information required to build the history of the actions performed by the package manager 110. The tagging tool 116 can be configured to parse the metadata and the other information associated with the action in order to extract any information that describes the action, the reasons the action was performed, and any software programs, files, and software libraries affected by the action. For example, the tagging tool 116 can parse and extract information such as the name of the software package 108, the version of the software package 108, the version of the previous software package 108 if updating, the reason the package manager 110 is performing the action (e.g. new software installation, software installation update), date of the action, and a list of software programs, files, and software libraries affected by the action.

In embodiments, once the information is identified, the tagging tool 116 can be configured to store the information in records reflecting the history of the actions performed by the package manager 110. The tagging tool 116 can be configured to store the information in a package event record 118 and a set 120 of change records 122. The tagging tool 116 can be configured to maintain the package event record 118 and the set 120 of change records 122 in a repository 124, such as a database.

In embodiments, the tagging tool 116 can be configured to utilize the package event record 118 to store the complete history of each action performed by the package manager 110. For each particular action, the tagging tool 116 can be configured to create an entry in the package event record 118. The tagging tool 116 can be configured to assign each entry in the package event record 118 a unique event identification. For each particular action, the tagging tool 116 can be configured to store in the entry, the unique event identification, any information that describes the particular action, the reasons the particular action was performed, the date, and any software programs, files, and software libraries affected by the particular action. As such, for each actions preformed by the package manager 110, the tagging tool 116 can maintain a complete history of the actions.

In embodiments, the tagging tool 116 can be configured to utilize the set 120 of change records 122 to store a history of how each action affects particular software programs, files, and software libraries. The tagging tool 116 can be configured to generate and maintain a separate change record 122 for each application program, file, or software library affected by an action of the package manager 110. Each time an entry is created in the package event record 118 for a particular action, the tagging tool 116 can be configured to create an entry in one or more change records 122 associated with the software programs, files, and software libraries affected by the particular action. For each entry, the tagging tool 116 can be configured to store, in each change record 122, the unique event identification, the effect of the action of the software programs, files or software libraries, a description of the action by the package manager 110, the date of the action, and the reasons for the action. As such, the tagging tool 116 can store a history of how each action effects particular software programs, files, and software libraries. Likewise, because the entries in the package event record 118 and the set 120 of the change records 122 share a unique event identification, the tagging tool 116 can identify and retrieve all the information associated with a particular action based on any information associated with the action.

In embodiments, the software package delivery and management system 100 can be configured to include a configuration management system 126, coupled to the network 106. The configuration management system 126 can be configured to perform various actions on the computing system 102. The action can include actions such as altering a configuration and settings of the computing system 102, installing and removing software packages on the computing system 102, installing and removing software programs on the computing system 102, modifying software programs, files, and software libraries on the computing system 102, and the like.

In embodiments, the configuration management system 126 can perform, the actions in order to maintain consistency and reliability of the software package delivery system and management system 100. The actions can include tracking the types and configurations of the computing system 102. Additionally, the actions can include managing, setting, and altering the configurations of the computing system 102 utilizing management classes. A management class can include a description of rules, profiles, data, files, or configurations that can be applied to the computing system 102.

In embodiments, the configuration management system 126 can be configured to cooperate with a configuration management client 128 on the computing system 102. The configuration management client 128 can be configured to cooperate with the configuration management system 126 to perform the actions mentioned above. The configuration management client 128 can be implemented as an application program that is capable of executing on the computing system 102 to perform the processes as described above. In either case, the configuration management client 128 can be stored on computer readable storage devices or media (CD, DVD, hard drive, portable storage memory, etc.) of the computing system 102 and executed by the computing system 102.

In embodiments, the configuration management system 126 and the configuration management tool 128 can be configured as any type of open-source or proprietary configuration management system, protocol and/or tool, and configured to support any type of configuration management services, protocols, or methods. For example, the configuration management system 126 and the configuration management tool 128 can be implemented utilizing known configuration management systems and tools such as Puppet™, cfengine, bcfg2, chef, capistrano, fabric, spine, or any other type of proprietary or open-source systems or tools.

In embodiments, the tagging tool 116 can be configured to cooperate with the configuration management system 126 and the configuration management tool 128 in order to determine and generate a history of the actions performed by the configuration management system 126. The history can include a description of the actions, the reasons why the actions were performed, and a list and description of the software programs, files, and software libraries that are affected by the actions. As such, the configuration management system 126, the configuration management tool 128 or a user of the computing system 102 can utilize the tagging tool 116 to track a history of all actions performed by the configuration management system 126 and the reasons the actions were performed. Additionally, the user of the computing system 102, the configuration management system 126, and/or the configuration management tool 128 can utilize the history of the action in order to access what effect additional actions will have on the computing system 102.

In embodiments, the configuration management system 126 and/or the configuration management tool 128 performs a particular action, the the configuration management system 126 and/or the configuration management tool 128 can call the tagging tool 116, via the API. Once invoked, the tagging tool 116 can determine and generate the history of the particular action performed by the configuration management system 126 and/or the configuration management tool 128 when called.

In embodiments, in order to determine the history, the tagging tool 116 can be configured to acquire any information associated with the action performed by the package manager 110. For example, when the configuration management system 126 and/or the configuration management tool 128 invokes the tagging tool 116, the configuration management system 126 and/or the configuration management tool 128 can be configured to provide, via the API, the details of the action taken. The information can include information that describes the action, the reasons the action was performed, and any software programs, files, and software libraries affected by the action. For example, the information can include the type of management action taken, the management classes used, the reasons for the action, the date of the action, identification of the software programs, files, and software libraries affected by the action, and details of the actions effect on the software programs, files, and software libraries.

In embodiments, the tagging tool 116 can be configured to acquire, from a user of the computing system 102 or the configuration management system 126, additional information about the actions being performed by the configuration management system 126 and/or the configuration management tool 128. To achieve this, the tagging tool 116 can be configured to generate GUIs that allow a user to enter information about the actions, such as comments on the actions, a description of the actions, reason for the action, etc. The tagging tool 116 can be configured to provide the GUIs and receive information entered into the GUIs via the API. For example, when the the configuration management system 126 and/or the configuration management tool 128 invokes the tagging tool 116, the tagging tool 116 can be configured to generate the GUIs and provide the GUIs, via the API.

In embodiments, once the information is identified, the tagging tool 116 can be configured to store the information in records reflecting the history of the actions performed by the configuration management system 126 and/or the configuration management tool 128. The tagging tool 116 can be configured to store the information in a configuration event record 130 and the set 120 of change records 122. The tagging tool 116 can be configured to maintain the configuration event record 130 in the repository 124.

In embodiments, the tagging tool 116 can be configured to utilize the configuration event record 130 to store the complete history of each action performed by the configuration management system 126 and/or the configuration management tool 128. For each particular action, the tagging tool 116 can be configured to create an entry in the configuration event record 130. The tagging tool 116 can be configured to assign each entry in the configuration event record 130 a unique event identification. For each particular action, the tagging tool 116 can be configured to store in the entry, the unique event identification, any information that describes the particular action, the reasons the particular action was performed, the date, and any software programs, files, and software libraries affected by the particular action. As such, for each action preformed by the configuration management system 126 and/or the configuration management tool 128, the tagging tool 116 can maintain a complete history of the actions.

In embodiments, for each of the actions preformed by the configuration management system 126 and/or the configuration management tool 128, the tagging tool 116 can be configured to create an entry in the change record 122 associated with the software programs, files and software libraries affected by the action. For each entry, the tagging tool 116 can be configured to store, in each change record 122, the unique event identification, the effect of the action of the software programs, files or software libraries, a description of the action preformed by the configuration management system 126 and/or the configuration management tool 128, the date of the action, and the reasons for the action.

In embodiments, the action performed by the configuration management system 126 and/or the configuration management tool 128 can include an action to be performed by the package manager 110. As such, the tagging tool 116 can be configured to create an entry in the package event record 118. The entry can include the unique event identification of the action of the the configuration management system 126 and/or the configuration management tool 128, the details of the action performed by the package manager 110 as described, and the reasons (e.g. at the direction of the configuration management system 126 and/or the configuration management tool 128).

In embodiments, to provide the history, the tagging tool 116 maintains the same unique event identification for a single action across the package event record 118, the configuration event record 130, and the set 120 of the change records 122. As such, the tagging tool 116 can store a history of how each action effects particular software programs, files, and software libraries. Likewise, because the entries in the package event record 118, the configuration event record 130, and the set 120 of the change records 122 share a unique event identification, the tagging tool 116 can identify and retrieve all the information associated with a particular action based on any information associated with the action.

In embodiments, the tagging tool 116 can be configured to retrieve the information stored in the package event record 118, the configuration event record 130, and the set 120 of change records 122, and organize and output the retrieved information in one or more reports. For example, the tagging tool 116 can be configured to receive requests, from the package manager 110, the configuration management system 126, the configuration management tool 128 and/or the user of the computing system 102, to view information on a particular action, a particular software package 108, and/or software programs, files, and software libraries. The tagging tool 116 can be configured to receive the request and generate one or more reports based on the request. The tagging tool 116 can be configured to provide the reports in GUIs, via the API. Likewise, the tagging tool 116 can be configured to generate and provide GUIs, via the API, that allows the user of the computing system 102 to request the reports and specify the subject of the reports.

In embodiments, the tagging tool 116 can be implemented as an application program that is capable of executing on the computing system 102 to perform the processes as described above. Likewise, the tagging tool 116 can be implemented as a portion of the package manager 110. In either case, the tagging tool 116 can be stored on computer readable storage devices or media (CD, DVD, hard drive, portable storage memory, etc.) of the computing system 102 and executed by the computing system 102. Likewise, the repository 124 can be stored on a computer readable storage devices or media (CD, DVD, hard drive, portable storage memory, etc.) of the computing system 102.

Figure 2:
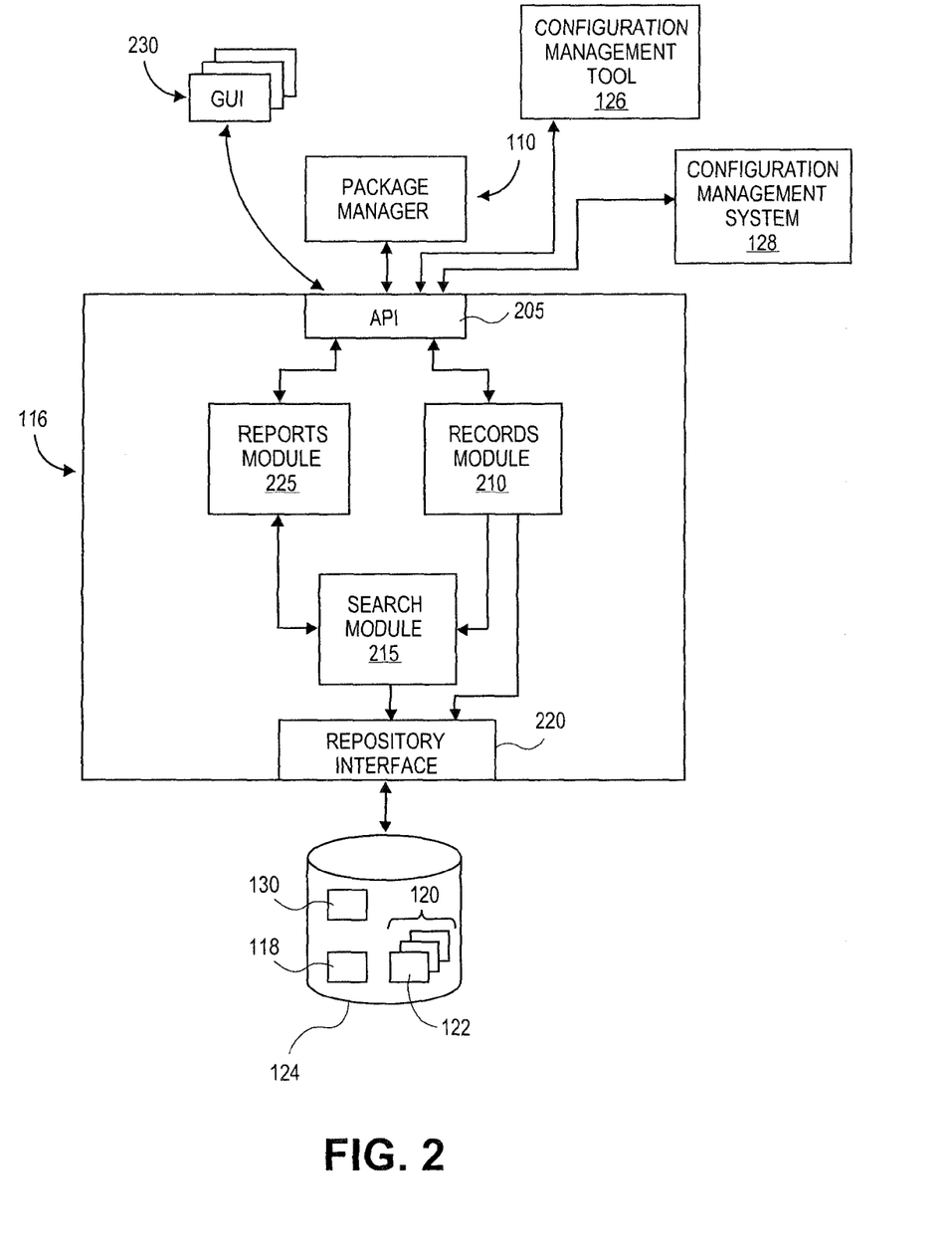
FIG. 2 illustrates an exemplary and generalized software diagram for the tagging tool, according to various embodiments.

FIG. 2 shows an exemplary and generalized diagram of the tagging tool 116, according to various embodiments. As illustrated in FIG. 2, the tagging tool 116 can be configured to include various components, such as an API 205, records module 210, search module 215, repository interface 220, and reports module 225. It should be readily apparent to those of ordinary skill in the art that the tagging tool 116 depicted in FIG. 2 represents a generalized schematic illustration and that other components may be added or existing components can be removed or modified.

In embodiments, the API 205 can be configured to communicate with the package manager 110, the configuration management system 126 and/or the configuration management tool 128. In particular, the package manager 110, the configuration management system 126 and/or the configuration management tool 128 can utilize the API 205 to call and invoke the tagging tool 116 when an action is taken by the package manager 110, the configuration management system 126 and/or the configuration management tool 128. Likewise, the API 205 can be configured to communicate with the package manager 110, the configuration management system 126 and/or the configuration management tool 128 in order to receive or to retrieve information associated with the actions taken by the package manager 110, the configuration management system 126 and/or the configuration management tool 128. Once information is received, the API 205 can pass the information to the appropriate component such as records module 210 and reports module 225, which are coupled to the API 205.

In embodiments, the API 205 can also be configured to generate and provide various GUIs 230 associated with the tagging tool 116. For example, the API 205 can be configured generate and provide GUIs 230 that allow the user of the computing system 102 to request the reports and specify the subject of the reports. The API 205 can pass the information to the appropriate component such as records module 210 and reports module 225. Likewise, the API 205 can be configured to provide the reports via the GUIs 230, for example, reports generated by the reports module 225. Additionally, the API 205 can be configured to generate and provide GUIs that allow the user to enter information about the action of the package manager 110. The API 205 can be configured to generate the GUIs 230 in any format that can be presented, by the computing system 102, to the user, for example displayed to the user.

In embodiments, the records module 210 can be configured to receive the metadata and any other information which is acquired by the API 205. The records module 210 can be configured to identify specific information required to build the history of the actions performed by the package manager 110, the configuration management system 126 and/or the configuration management tool 128. The records module 210 can be configured to parse the metadata and the other information associated with the action in order to identify and extract any information that describes the actions, the reasons the action was performed, and any software programs, files, and software libraries affected by the action.

For example, for action by the package manager 110, the records module 210 can parse and extract information such as the name of the software package 108, the version of the software package 108, the version of the previous software package 108 if updating, the reason the package manager 110 is performing the action (e.g. new software installation, software installation update), the date of the action, and a list of software programs, files, and software libraries affected by the action. Likewise, for example, for action by the configuration management system 126 and/or the configuration management tool 128, the records module 210 can parse and extract information such as information that describes the particular action, the reasons the particular action was performed, the date, and any software programs, files, and software libraries affected by the particular action.

In embodiments, the records module 210 can be coupled to the search module 215 and the repository interface 220. Once the information is identified, the records module 210 can be configured store the information in records reflecting the history of the actions performed by the package manager 110, the configuration management system 126 and/or the configuration management tool 128. The records module 210 can be configured to store the information in the package event record 118, the configuration event record 130, and the set 120 of change records 122.

In embodiments, the records module 210 can be configured to utilize the package event record 118 to store the complete history of each action performed by the package manager 110. For each particular action, the records module 210 can be configured to create an entry in the package event record 118. The records module 210 can be configured to assign each entry in the package event record 118 a unique event identification. For each particular action, the records module 210 can be configured to store in an entry, the unique event identification, any information that describes the particular action, the reasons the particular action was performed, and any software programs, files, and software libraries affected by the particular action.

In embodiments, the records module 210 can be configured to utilize the configuration event record 130 to store the complete history of each action performed by the configuration management system 126 and/or the configuration management tool 128. For each particular action, the records module 210 can be configured to create an entry in the configuration event record 130. The records module 210 can be configured to assign each entry in the configuration event record 130 a unique event identification. For each particular action, the records module 210 can be configured to store in an entry, the unique event identification, any information that describes the particular action, the reasons the particular action was performed, and any software programs, files, and software libraries affected by the particular action.

In embodiments, the records module 210 can be configured to utilize the set 120 of change records 122 to store a history of how each action effects particular software programs, files, and software libraries. The records module 210 can be configured to generate and maintain a separate change record 122 for each software program, file, or software library affected by an action of the package manager 110, the configuration management system 126 and/or the configuration management tool 128. Each time an entry is created in the package event record 118 for a particular action, the tagging tool 116 can be configured to create an entry in one or more change records 122 associated with the software programs, files, and software libraries affected by the particular action. For each entry, the records module 210 can be configured to store, in each change record 122, the unique event identification, the effect of the action of the software programs, files or software libraries, a description of the action by the package manager 110, the date of the action, and the reasons for the action.

In embodiments, to create a new entry and store data in the package event record 118, the configuration event record 130, and change records 122 for software programs, files, and software libraries affected by an event, the records module 210 can be configured to cooperate with the search module 215 and the repository interface 220 to identify if the records exist. In particular, the records module 210 can pass a request to the search module 215 that identifies the package event record 118, the configuration event record 130, and change records 122 sought. The search module 215 can be configured to search the repository for the package event record 118, the configuration event record 130, and change records 122 sought via the repository interface 220. If the records exist, the search module 215 can be configured to retrieve the package event record 118, the configuration event record 130, and change records 122 sought, via the repository interface 220, and configured to pass the package event record 118, the configuration records 130, and change records 122 sought to the records module 210. If one or more of the records do not exist, the search module 215 can be configured to notify the records module 210, and the records module 210 can be configured to create the non-existent records. Once entries are made, the records module 210 can be configured to store the records in the repository 124, via the repository interface 220.

In embodiments, the reports module 225 can be coupled to the search module 215. The reports module 225 can be configured to receive a request for information stored in the repository and generate reports. In particular, the reports module 225 can be configured to cooperate with the search module 215 to identify the package event record 118, configuration records 130 and change records 122, which contain information relevant to the request. The search module 215 can be configured to search the repository, via the repository interface 220, and retrieve the package event record 118, the configuration event record 130, and any change records 122 relevant to the request. The search module 215 can pass the retrieved records to the reports module 225. As such, the reports module 225 can generate reports and pass the reports to the API 205 to provide in the GUIs 230.

As mentioned above, the tagging module 116 can track and record the history of actions performed by the package manager 110. For example, the package manager 110 can receive a request from a user of the computing system 102 to update a particular software package 108, such as updating Open Office from version 1 (v. 1) to version (v. 2). When the package manager 110 takes the action, the package manager 110 can call the tagging tool 116 via the API 205. Then, the package manager 110 can provide the tagging tool 116 with the metadata for the Open Office v. 2 and any other information relevant to the action.

In this example, the API 205 can pass the metadata for the open office v. 2 and any other information relevant to the action to the records module 210. The records module 210 can parse the metadata for the open office v. 2 and any other information relevant to the action and extract information describing the action and reason for the action such as the name of the software package 108 (Open Office), the version of the software package 108 (Open Office v. 2), the version of the previous software package 108 (Open Office v. 1), the reason the package manager 110 is performing the action (updating Open Office v. 1 to v. 2), the date (Jan. 1, 2009), and a list of software programs, files, and software libraries affected by the action (e.g. Open Office writer, Open Office spreadsheet, software library X, software library Y).

In this example, after extracting the information, the records module 210 can cooperate with the search module 215 and the repository interface 220 in order to retrieve the package event record 118 and the change records 122 for software programs, files, and software libraries affected by the action, such as the change records 122 for Open Office writer, Open Office spreadsheet, software library X, software library Y. The records module 210 can add a new entry in the package event record 118 and the change records 122 for Open Office writer, Open Office spreadsheet, software library X, software library Y.

Figure 3A:
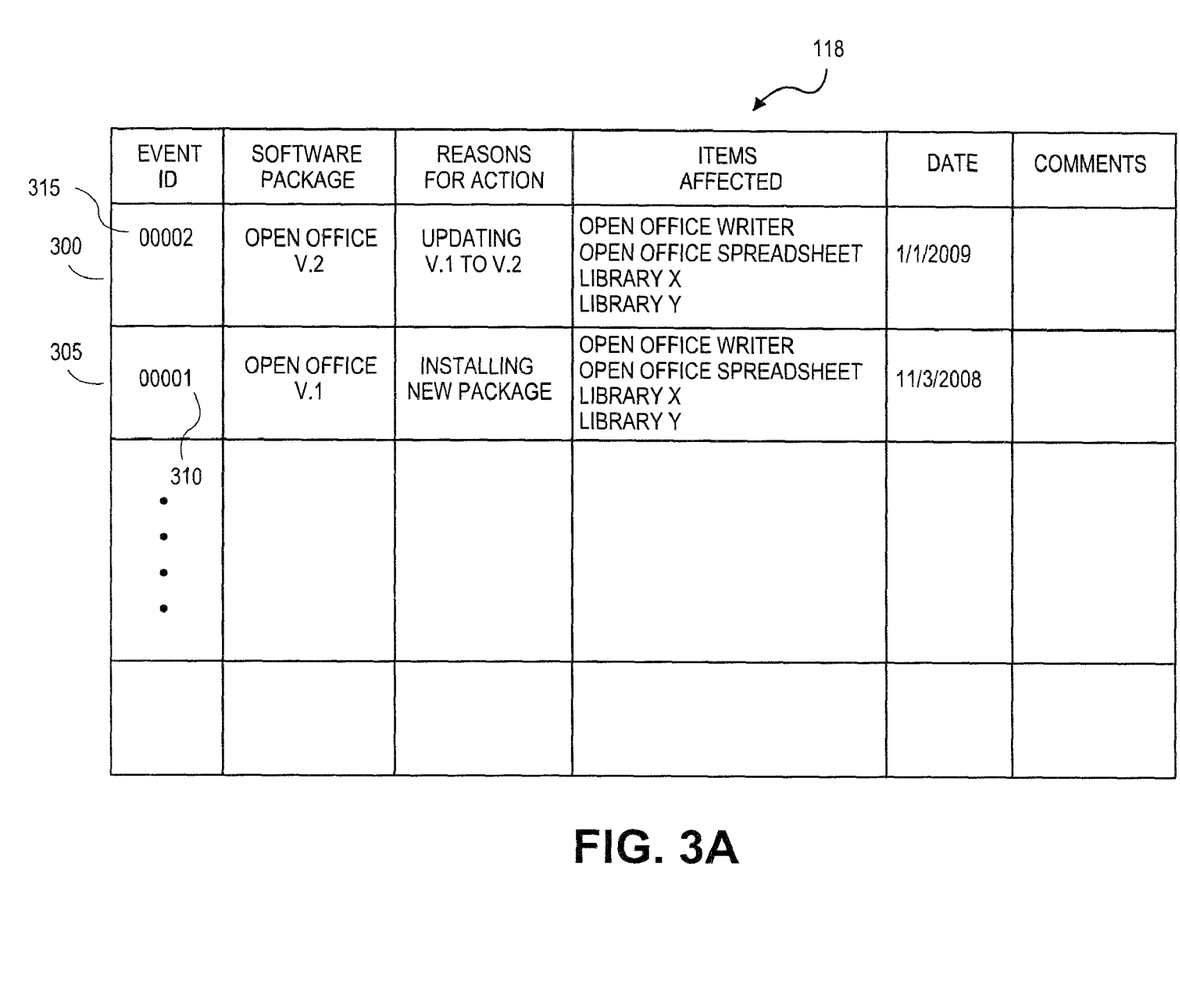
FIGS. 3A and 3B illustrate an exemplary package event record and exemplary change record generated by tagging tool, according to various embodiments.

FIG. 3A illustrates an exemplary diagram for adding a new entry 300 for the update of Open Office in the package event record 118 for the example described above. As illustrated, the package event record 118 can include previous entries such as entry 305, which details the installation of Open Office and is assigned a unique event identification 310, such as "00001". The entry 305 can include such information as the name of the software package, the reason for the action, software programs, files, and software libraries affected by the action, the date of the action, and comments supplied by the user.

In this example, the records module 210 can create the new entry 300 and assign the new entry 300 a unique event identification 315, such as "00002". The records module 210 can then populate the new entry with the information detailing the action, such as the name of the software package, the reason for the action, software programs, files, and software libraries affected by the action, the date of the action, and comments supplied by the user.

Figure 3B:
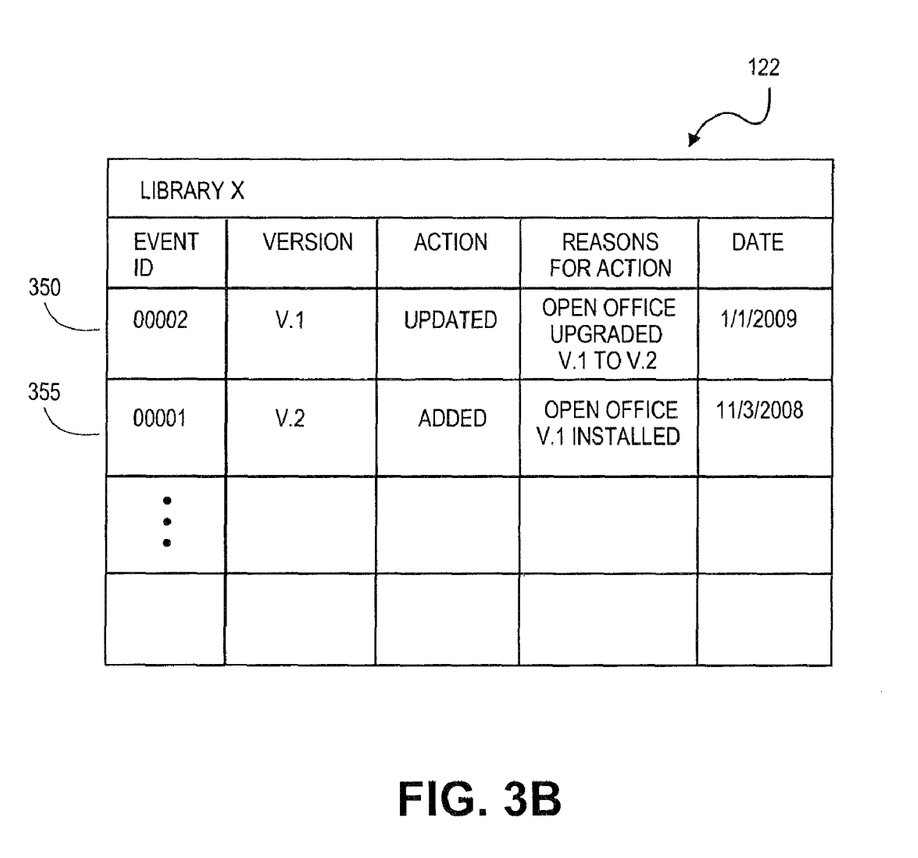

FIG. 3B illustrates an exemplary diagram for adding a new entry 350 for the update of Open Office in the change record 122 for the software library X, for the example described above. As illustrated, the change record 122 can include previous entries such as entry 355, which details the installation of Open Office and the addition of the software library X. The entry 355 can include such information as the unique event identification 310 "00001", the actions effect on library X ("addition"), version of library X ("v. 1"), the reasons for the action ("Open Office v. 1 installed"), and date ("Nov. 3, 2008").

In this example, the records module 210 can create the new entry 350 in order to detail the actions effect on library X. The records module 210 can populate the new entry 350 with the information of the action such as the unique event identification "00002", the actions effect on library X ("updated"), version of library X ("v. 2") the reasons for the action ("Open Office v. 1 updated to Open Office v. 2 installed"), and date ("Jan. 1, 2009").

Continuing this example, the tagging module 116 can track and record the history of actions performed by the the configuration management system 126 and/or the configuration management tool 128. For example, the configuration management system 126 and/or the configuration management tool 128 can initiate performing an action on the computing system 102, for instance, upgrading the operating system due to a change in the management class associated with the computing system 102. In this example, upgrading the operating system can cause the software library X to be upgraded to version 3 (v. 3). When the configuration management system 126 and/or the configuration management tool 128 takes the action, the configuration management system 126 and/or the configuration management tool 128 can call the tagging tool 116 via the API 205. Then, the configuration management system 126 and/or the configuration management tool 128 can provide the tagging tool 116 with the information related to the action such as a description of the action (upgrading the operating system), the reasons (a change in the management class), and the software programs, files, and software libraries affected by the action (software library X), and the details of the effect (software library X upgraded to v. 3).

In this example, the API 205 can pass the information relevant to the action to the records module 210. The records module 210 can parse the information and extract information describing the action and reason for the action such as the information related to the action such as a description of the action (upgrading the operating system), the reasons (a change in the management class), and the software programs, files, and software libraries affected by the action (software library X), and the details of the effect (software library X upgraded to v. 3).

In this example, after extracting the information, the records module 210 can cooperate with the search module 215 and the repository interface 220 in order to retrieve the configuration event record 130 and the change records 122 for software programs, files, and software libraries affected by the action, such as the change records 122 for software library X. The records module 210 can add a new entry in the configuration event record 130 and the change records 122 for software library X.

Figure 4A:
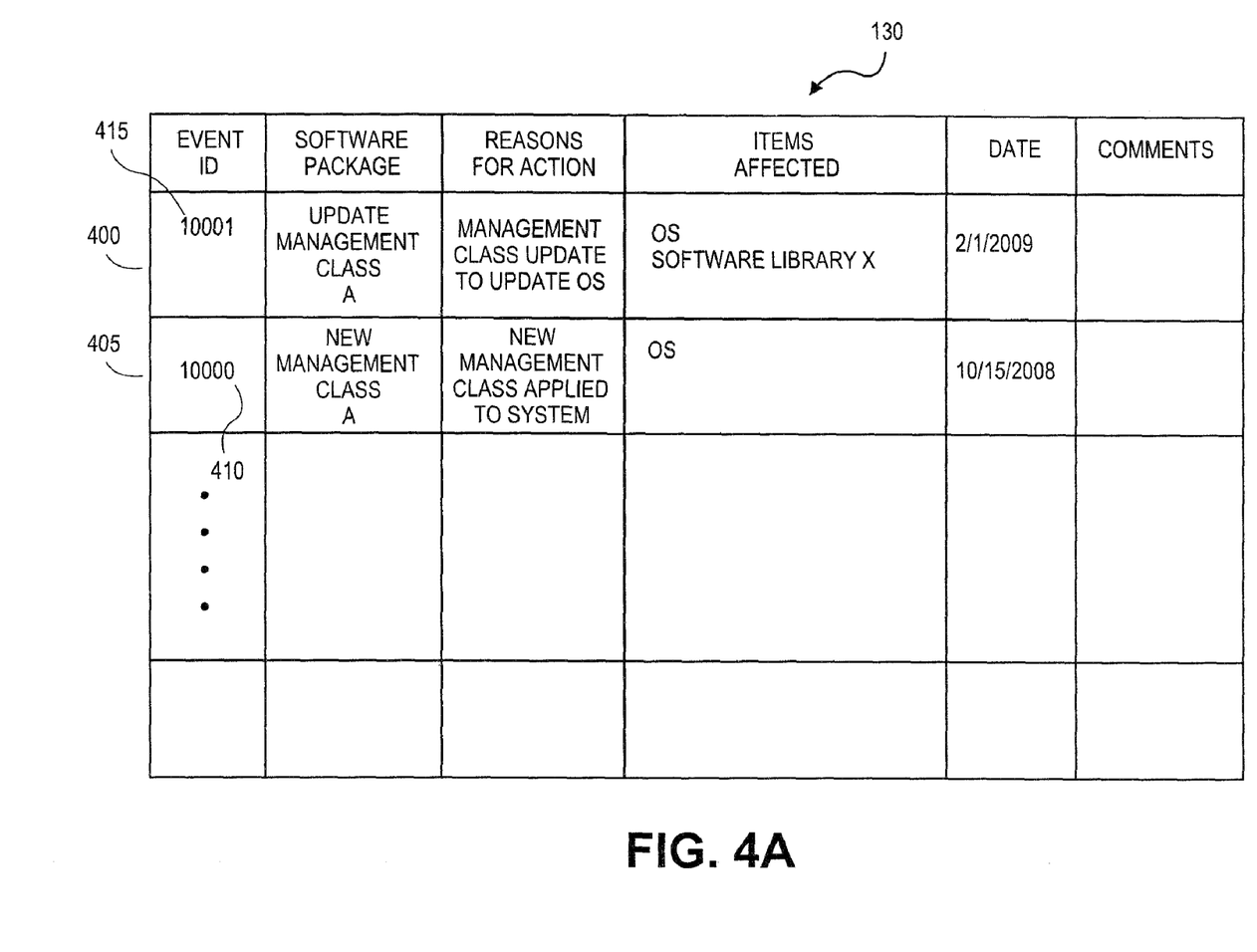
FIGS. 4A and 4B illustrate an exemplary configuration event record and the exemplary change record generated by the tagging tool, according to various embodiments.

FIG. 4A illustrates an exemplary diagram for adding a new entry 400 for the update of the operating system by the configuration management system 126 and/or the configuration management tool 128 in the configuration event record 130 for the example described above. As illustrated, the configuration event record 130 can include previous entries such as entry 405 with a unique event identification 410 "10000", which details the addition of a new management class. The entry 405 can include such information as the action performed, the reason for the action, software programs, files, and software libraries affected by the action, the date of the action, and comments supplied by the user.

In this example, the records module 210 can create the new entry 400 and assign the new entry 400 a unique event identification 415, such as "10001", which details the update of the management class. The records module 210 can then populate the new entry with the information detailing the action, such information as the action performed, the reason for the action, software programs, files, and software libraries affected by the action, the date of the action, and comments supplied by the user.

Figure 4B:
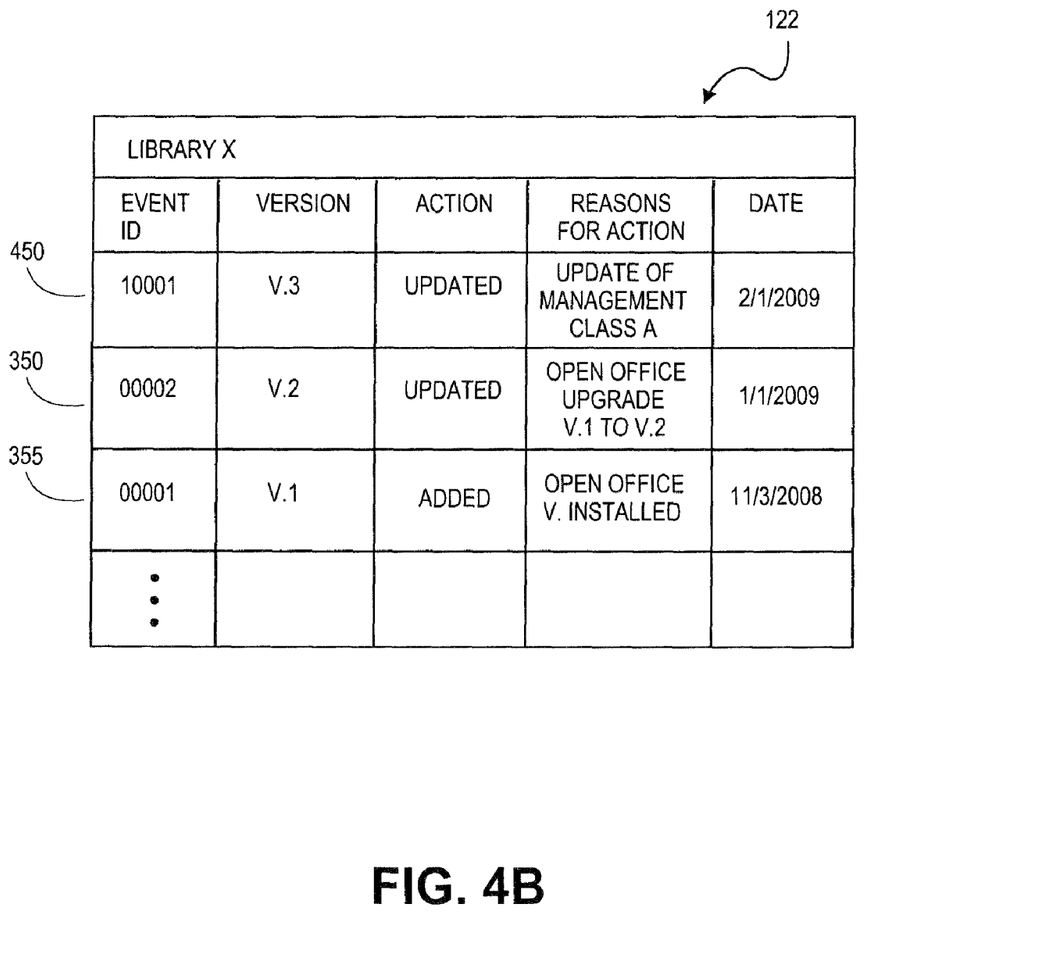

FIG. 4B illustrates an exemplary diagram for adding a new entry 450 for the update of the operating system by the configuration management system 126 and/or the configuration management tool 128 in the change record 122 for the software library X, for the example described above. As illustrated, the change record 122 can include previous entries such as entry 355, which details the addition and upgrade of the software library X due to Open Office.

In this example, the records module 210 can create the new entry 450 in order to detail the actions effect on library X. The records module 210 can populate the new entry 450 with the information of the action such as the unique event identification "10001", the actions effect on library X ("updated"), version of library X ("v. 3") the reasons for the action ("update of management class A"), and date ("Feb. 1, 2009").

As mentioned above, the tagging tool 116 can generate various reports as requested by a user of the computing system 102 and provide the generated reports to the user, via the API 205. Continuing with the above example, the user of the computing system 102 can desire to know all actions that may have caused a certain behavior in the computing system 102. For instance, in the above example, after the action by the configuration management system 126 and/or the configuration management tool 128, Open Office may no longer operate properly. As such, the user can desire to know what effects updating the management class had on the computing system 102.

In this example, the user can request a report for the software programs, file, and software libraries affected by the update of the management class. As such, the tagging tool 116 can retrieve the configuration event record and display the item affected by the update of the management class, i.e. software library X.

In this example, the user can request the history of software library X utilizing GUIs 230 in order to determine how this affected the computing system 102. Once the request is received, the reports module 225 can cooperate with the search module 215 to retrieve the change record 122 for software library X. Once retrieved, the reports module 225 can generate a report detailing the information contained in the change log 122.

Figure 5:
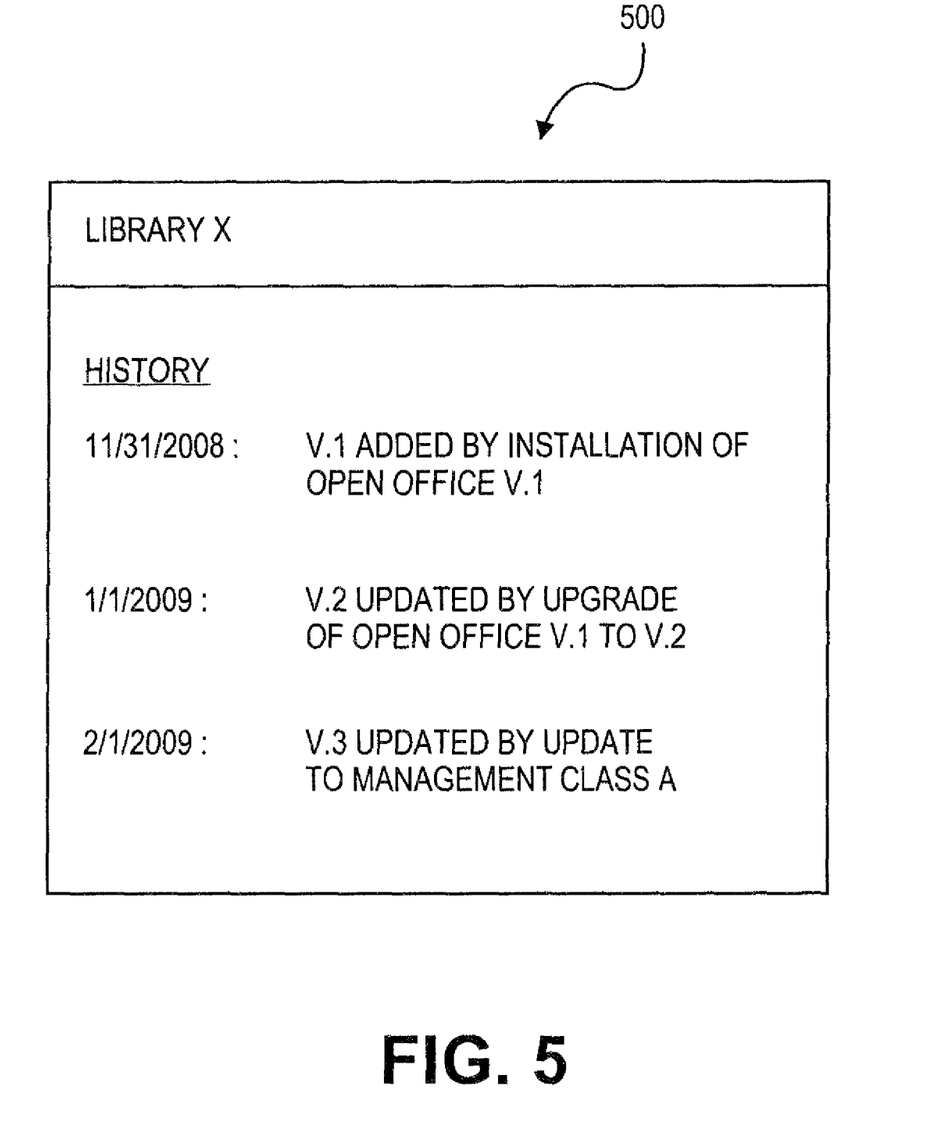
FIG. 5 illustrates an exemplary report generated by the tagging tool, according to various embodiments.

FIG. 5 illustrates an exemplary report 500 for displaying the information contained in the change record 122 for the library X. As illustrated, the report 500 can include the information contained in the various entries for actions that affected the library X. As such, in the example, the user can determine that the update of the management class caused the software library X to upgrade to v. 3 and that software library X is related to Open Office. As such the user can diagnose the cause of the failure of Open Office and possible action to restore Open Office, e.g. changing software library X back to v. 2.

Figure 6:
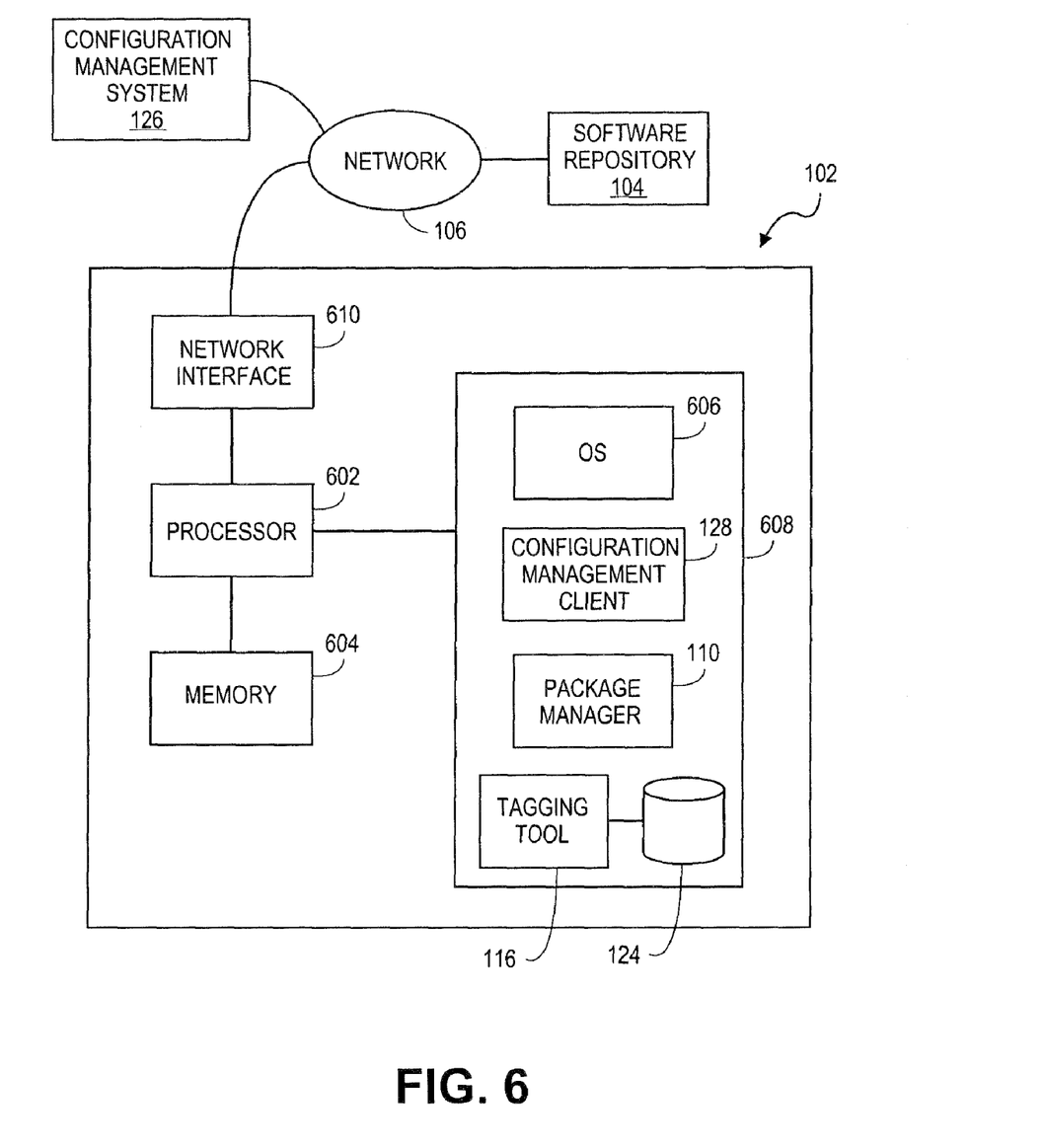
FIG. 6 illustrates an exemplary hardware configuration for an administrator computing system, according to various embodiments.

FIG. 6 illustrates an exemplary diagram of hardware and other resources that can be incorporated in the computing system 102 and configured to communicate with the software repository 104 and the configuration management system 126 via one or more networks 106, according to embodiments. In embodiments as shown, the computing system 102 can comprise a processor 602 communicating with memory 604, such as electronic random access memory, operating under control of or in conjunction with operating system 606. Operating system 606 can be, for example, a distribution of the Linux™ operating system, such as Red Hat™ Enterprise Linux, Fedora, etc., the Unix™ operating system, or other open-source or proprietary operating system or platform. Processor 602 also communicates with one or more computer readable storage devices or media 608, such as hard drives, optical storage, and the like, for maintaining the operating system 606, package manager 110, the configuration management client 128, the tagging tool 116, and the repository 124. Processor 602 further communicates with network interface 610, such as an Ethernet or wireless data connection, which in turn communicates with one or more networks 106, such as the Internet or other public or private networks.

Processor 602 also communicates with the package manager 110, the configuration management client 128 and the tagging tool 116, to execute control logic and allow performance the tracking actions associated with the package manager 110 and the configuration management system 126 as described above and below. Other configurations of the computing system 102, associated network connections, and other hardware and software resources are possible.

While FIG. 6 illustrates the computing system 102 as a standalone system including a combination of hardware and software, the computing system 102 can include multiple systems operating in cooperation. The tagging tool 116 can be implemented as a software application or program capable of being executed by the computing system 102, as illustrated, or other conventional computer platforms. Likewise, the tagging tool 116 can also be implemented as a software module or program module capable of being incorporated in other software applications and programs, such as package manager 110 or the configuration management client 128. In any example, the tagging tool 116 can be implemented in any type of conventional proprietary or open-source computer language. When implemented as a software application or program code, the tagging tool 116 can be stored in a computer readable storage medium, such as storage 608, accessible by the computing system 102. Likewise, during execution, a copy of the tagging tool 116 can be stored in the memory 604.

Figure 7:
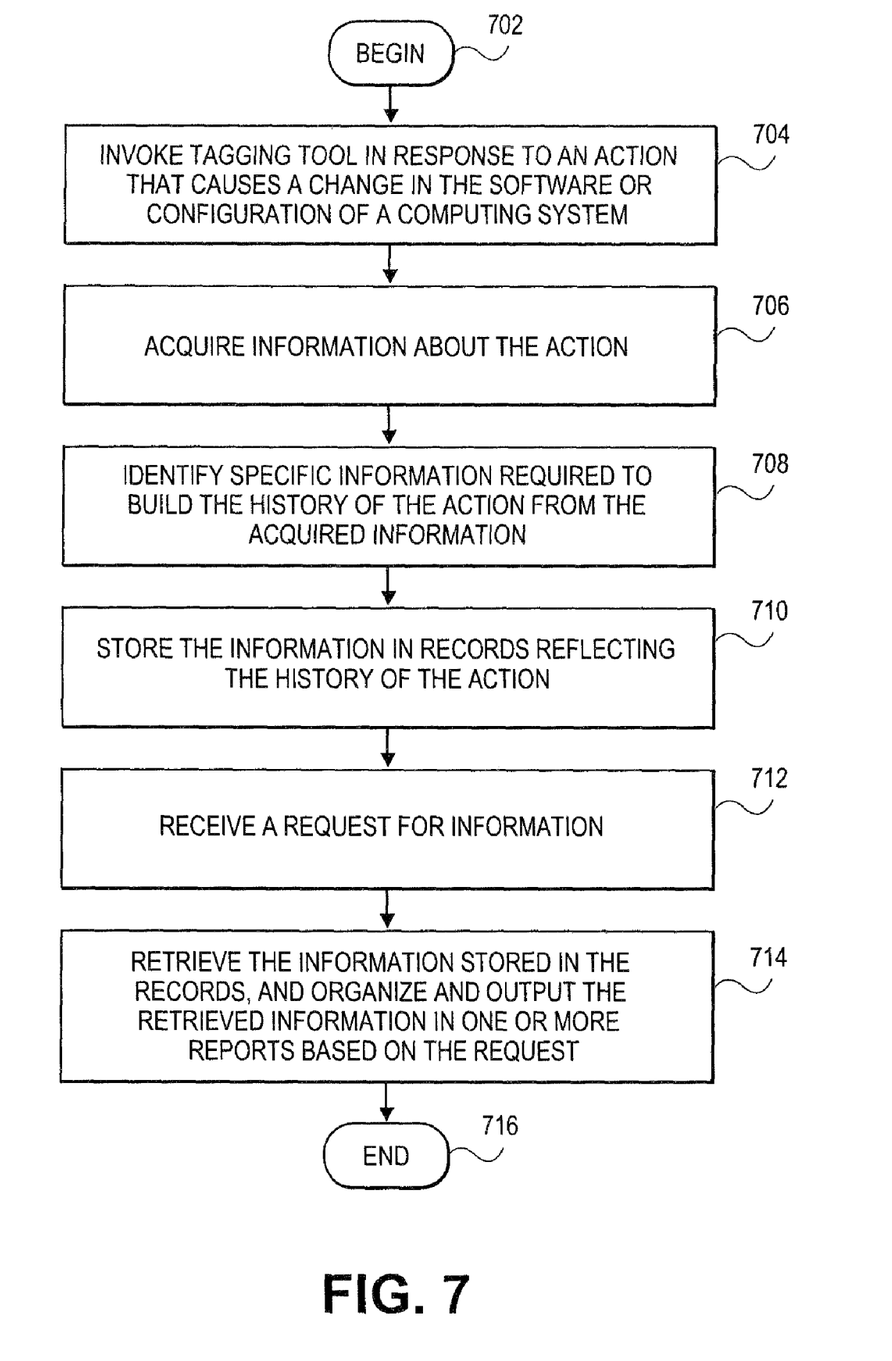
FIG. 7 illustrates a flowchart of an exemplary process for generating a history of changes related to software change and configuration changes, according to various embodiments.

FIG. 7 illustrates a flow diagram for tracking a history of changes in a computing system, according to embodiments of the present teachings. In 702, the process can begin. In 704, the tagging tool 116 can be invoked in response to an action that causes a change in the software or configuration of the computing system 102. For example, when the package manager 110 performs an action, the package manager 110 can invoke the tagging tool in order to establish a history of the action. Likewise, when the configuration management system 126 and/or the configuration management tool 128 perform an action, the configuration management system 126 and/or the configuration management tool 128 can invoke the tagging tool in order to establish a history of the action In 706, the tagging tool 116 can acquire information about the action. For example, the tagging tool 116 can acquire the metadata and any other information associated with the action performed by the package manager 110. For instance, if the package manager 110 invokes the tagging tool 116, the package manager 110 can be configured to provide, via the API, the metadata for the software package 108 associated with the action. Likewise, when the package manager 110 invokes the tagging tool 116, the package manager 110 can provide, via the API, other information such as a description of the action (e.g. action selected by the user via a GUI, description of the action, and the like). Additionally, the tagging tool 116 can retrieve, via the API, the metadata and any other information, associated with the action, from the database 114. Additionally, the tagging tool 116 can receive information about the action entered by the user in a GUI provided by the tagging tool. Likewise, if the configuration management system 126 and/or the configuration management tool 128 invokes the tagging tool 116, the configuration management system 126 and/or the configuration management tool 128 can provide details of the action to the tagging tool via the API.

In 708, the tagging tool 116 can identify specific information required to build the history of the action performed from the acquired information. For example, the tagging tool 116 can parse the metadata and the other information associated with the action in order to extract any information that describes the action, the reasons the action was performed, and any software programs, files, and software libraries affected by the action. For instance, the tagging tool 116 can parse and extract information such as the name of the software package 108, the version of the software package 108, the version of the previous software package 108 if updating, the reason the package manager 110 is performing the action (e.g. new software installation, software installation update), date of the action, and a list of software programs, files, and software libraries affected by the action. Likewise, if the configuration management system 126 and/or the configuration management tool 128 provides the information, the tagging tool 116 can parse and extract information such as information that describes the particular action, the reasons the particular action was performed, the date, and any software programs, files, and software libraries affected by the particular action.

In 710, the tagging tool 116 can store the information in records reflecting the history of the action. For example, the tagging tool 116 can store the information in package event record 118, the configuration event record 130 and a set 120 of change records 122. The tagging tool 116 can maintain the package event record 118, the configuration event record 130, and the set 120 of the change records 122 in a repository 124, such as a database.

In 712, the tagging tool 116 can receive a request for information stored in the repository 124. For example, the tagging tool 116 can receive requests, from the package manager 110, the user of the computing system 102, the configuration management system 126 and/or the configuration management tool 128 to view information on a particular action, a particular software package 108, and/or software programs, files, and software libraries. To receive the request, the tagging tool 116 can generate and provide GUIs, via the API, that allows the user of the computing system 102 to request the reports and specify the subject of the reports.

In 714, the tagging tool 116 can retrieve the information stored in the records, and organize and output the retrieved information in one or more reports. For example, the tagging tool 116 can retrieve the information stored in the package event record 118, the configuration event record 130 and the set 120 of change records 122, and organize and output the retrieved information in one or more reports based on the request. The tagging tool 116 can provide the reports in GUIs, via the API.

In 716, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
    acquiring, by a processor, information associated with a change in a configuration of a computing system;
    extracting, by the processor, specific information from the acquired information associated with the change, the specific information comprising at least one of a description of the change, a reason for the change, or an identification of at least one other item affected by the change; and
    storing, by the processor, the specific information in a database accessible to the computing system, wherein storing the specific information comprises:
        storing the specific information in a first record, and
        storing the specific information in a second record associated with at least one item affected by the change.

2. The method of claim 1, the method further comprising:
    receiving a request for a set of the specific information;
    retrieving the set of the specific information based on the request from the database; and
    providing the set of the specific information.

3. The method of claim 2, wherein providing the set of the specific information comprises:
    providing the set of the specific information in a graphical user interface.

4. The method of claim 1, wherein the acquired information associated with the change comprises at least one of metadata for installing a software package, information from a package manager describing the change, information provided by a user of the computing system, and information provided by a configuration management system describing the change.

5. The method of claim 1, wherein acquiring the information comprises:
    receiving the information associated with the change from a configuration management system that caused the change.

6. The method of claim 1, wherein acquiring the information comprises:
    providing an interface to receive information about the change from a user of the computing system.

7. The method of claim 1, wherein the at least one other item affected by the change comprises at least one of a software program, a file, and a software library.

8. The method of claim 1, wherein storing the specific information further comprises:
   storing a unique identification for the change in the first record; and
   storing the unique identification for the change in the second record associated with at least one item affected by the change.

9. A non-transitory computer readable storage medium comprising instructions for causing a processor to perform a method, comprising:
   acquiring, by the processor, information associated with a change in a configuration of a computing system;
   extracting, by the processor, specific information from the acquired information associated with the change, the specific information comprising at least one of a description of the change, a reason for the change, or an identification of at least one other item affected by the change; and
   storing, by the processor, the specific information in a database accessible to the computing system, wherein storing the specific information comprises:
       storing the specific information in a first record, and
       storing the specific information in a second record associated with at least one item affected by the change.

10. The non-transitory computer readable storage medium of claim 9, the method further comprising:
    receiving a request for a set of the specific information;
    retrieving the set of the specific information based on the request from the database; and
    providing the set of the specific information.

11. The non-transitory computer readable storage medium of claim 10, wherein providing the set of the specific information comprises:
    providing the set of the specific information in a graphical user interface.

12. The non-transitory computer readable storage medium of claim 9, wherein the acquired information associated with the change comprises at least one of metadata for installing a software package, information from a package manager describing the change, information provided by a user of the computing system, and information from a configuration management system describing the change.

13. The non-transitory computer readable storage medium of claim 9, wherein acquiring the information comprises:
    receiving the information associated with the change from a configuration management system that caused the change.

14. The non-transitory computer readable storage medium of claim 9, wherein acquiring the information comprises:
    providing an interface to receive information about the change from a user of the computing system.

15. The non-transitory computer readable storage medium of claim 9, wherein the at least one other item affected by the change comprises at least one of a software program, a file, and a software library.

16. The non-transitory computer readable storage medium of claim 9, wherein storing the specific information further comprises:
    storing a unique identification for the change in the first record; and
    storing the unique identification for the change in the second record associated with at least one item affected by the change.

17. A system for tracking a history of software changes, comprising:
    a database; and
    a processor, communicating with the database and configured to execute a configuration management tool and a tagging tool, wherein the configuration management tool is configured to:
        perform a change in a configuration of the system, and wherein the tagging tool is configured to;
        acquire information associated with the change in the configuration;
        extract specific information from the acquired information associated with the change, the specific information comprising at least one of a description of the change, a reason for the change, or an identification of at least one other item affected by the change; and
        store the specific information in the database, wherein to store the specific information, the tagging tool is configured to:
            store the specific information in a first record, and
            store the specific information in a second record associated with at least one item affected by the change.

18. The system of claim 17, further comprising a display communicating with the processor, wherein the tagging tool is further configured to:
    provide an interface to the display to receive information about the change from a user.

19. The system of claim 17, wherein the tagging tool is further configured to:
    receive the information associated with the change from the configuration management tool.

20. The system of claim 17, wherein the tagging tool is further configured to
    store a unique identification for the change in the first record; and
    store the unique identification for the change in the second record associated with at least one item affected by the change.

* * * * *